United States Patent

Chikuma et al.

[11] Patent Number: 6,055,093
[45] Date of Patent: Apr. 25, 2000

[54] OPTICAL AMPLIFYING APPARATUS AND LINEAR RELAY OPTICAL AMPLIFIER TRANSMITTER

[75] Inventors: Tadayuki Chikuma; Tsutomu Tajima, both of Tokyo, Japan

[73] Assignee: NEC Corporation, Tokyo, Japan

[21] Appl. No.: 08/833,121

[22] Filed: Apr. 4, 1997

[30] Foreign Application Priority Data

Apr. 9, 1996 [JP] Japan ................................ 8-086300

[51] Int. Cl.⁷ ........................... H01S 3/16; H04B 10/12
[52] U.S. Cl. .................... 359/337; 359/124; 359/160; 359/341
[58] Field of Search .................... 359/124, 160, 359/177, 337, 341

[56] References Cited

U.S. PATENT DOCUMENTS

| 5,510,926 | 4/1996 | Bayart et al. | 359/160 |
| 5,561,552 | 10/1996 | Shibuya | 359/341 |
| 5,764,404 | 6/1998 | Yamane et al. | 359/337 |

FOREIGN PATENT DOCUMENTS 637148   2/1995   European Pat. Off. .

*Primary Examiner*—Nelson Moskowitz
*Attorney, Agent, or Firm*—Young & Thompson

[57] ABSTRACT

A wavelength multiplexing optical transmitting apparatus includes a plurality of optical transmitters for transmitting optical signals having mutually different wavelengths, a wavelength multiplexing circuit for wavelength multiplexing optical signals, an optical amplifier for directly amplifying the wavelength multiplexed optical signal and for producing an amplified multiplexed optical signal, an optical signal counting detector for branching the amplified multiplexed optical signal into signals of the respective wavelengths and for detecting the number of optical signals presently being transmitted, and an optical amplifier control circuit for controlling an output from the optical amplifier according to the number of optical signals; the optical amplifier includes a fiber made of a material to which a rare earth element is added and an excitation light to the fiber; the optical amplifier control circuit includes an excitation light control circuit for controlling an intensity of the excitation light according to the number of light signals; wherein to obtain an intensity of amplified optical signal predetermined according to the number of light signals, the excitation light control circuit sets an injection current to the excitation light source.

6 Claims, 3 Drawing Sheets

OPTICAL AMPLIFYING APPARATUS AND LINEAR RELAY OPTICAL AMPLIFIER TRANSMITTER

BACKGROUND OF THE INVENTION

The present invention relates to an optical amplifying apparatus and the control of a linear relay optical amplifying apparatus in which an optical amplifying apparatus is arranged in each relay, and in particular, to an optical amplifying apparatus for linear relay in which optical signals having a plurality of mutually different wavelengths are multiplexed with each other according to wavelengths to be amplified at a time by an optical amplifier for transmission thereof.

DESCRIPTION OF THE RELATED ART

In the conventional optical amplifying apparatus, an input signal to an optical amplifier branches therein such that a reception level of the optical signal is detected via a reception level monitor. The optical amplifier produces an output signal in accordance with the detected reception level (reference is to be made to, for example, the Japanese Patent Laid-Open Ser. No. 4-229837). However, in a wavelength multiplexing optical transmission system in which a plurality of optical signals having mutually different wavelengths in the same wavelength band are multiplexed with respect to wavelengths for transmission thereof, particularly, in an optical amplifying apparatus in which optical signals having undergone wavelength multiplexing are amplified at a time by an optical amplifier for transmission thereof, there has not been known a guaranteed output monitor or control means.

In an optical multiplexing transmission system in which optical signals having two or more mutually different wavelengths in the same wavelength band are wavelength multiplexed and are amplified at a time by an optical amplifier to be transmitted therefrom, there may possibly occur a case in which an optical output of at least one wavelength of the input optical signals is interrupted for some reasons.

In this situation, when the control means of the conventional optical amplifier is directly applied thereto, it is impossible to monitor states of transmission of the respective optical signals. Therefore, when a light signal of at least one wavelength is interrupted in the optical signals, it is probable that the condition is detected as a decrease in the input level of compound optical signals. On this occasion, the optical amplifier functions to increase the gain therefor to keep the output level. Resultantly, the degree of amplification per optical signal of each wavelength is excessively increased.

SUMMARY OF THE INVENTION

It is therefore an object of the present invention to provide an optical amplifying apparatus in which the states of transmission of an optical signal multiplied at a time in a wavelength multiplexed form is detected on a transmission side thereof to thereby control the output level of the optical amplifier.

Another object of the present invention to provide a linear relay optical amplifying apparatus to which the optical amplifying apparatus is applied in which the optical amplifying apparatus sends a control signal, including information of the number of optical signals being sent, to an optical linear relay disposed in a downstream position of the optical amplifying apparatus and connected via an optical transmission path thereto such that even when a light signal of at least one wavelength of the optical signals is interrupted, the output of the remaining optical signal of each wave of wavelength is kept at a fixed level to as to obtain a desired output.

To remove the drawback of the conventional optical amplifying apparatus in accordance with the present invention, there is provided an optical amplifying apparatus including at least two optical signal transmitters for respectively transmitting therefrom optical signals having mutually different wavelengths, a wavelength multiplexer for wavelength multiplexing the optical signals to transmit therefrom a wavelength multiplexed optical signal, and an optical amplifier for directly amplifying the multiplexed optical signal and outputting therefrom an amplified multiplexed optical signal. The optical amplifying apparatus further includes an optical mixer for branching the amplified multiplexed optical signal into component signals thereof, the component signals having wavelengths of the signals before the multiplexing operation; an optical signal counting detector means for detecting the number of optical signals currently being transmitted according to the optical signals thus attained through the branching operation, and an optical amplifier controller for controlling an output from the optical amplifier according to the number of optical signals.

The optical signal counting detector includes an optical signal branch disposed at a stage prior to each optical transmitter for producing branch optical signals, an opto-electric convertor for converting each of the branch optical signal into an electric signal, and a counter for counting the optical signals detected by the opto-electric convertor. As the opto-electric converter, there is adopted a photodiode for receiving a light having a wavelength of each of the branch optical signals corresponding to the number of wavelengths in the wavelength multiplexing operation.

The optical amplifier of the optical amplifying apparatus in accordance with the present invention further includes an optical branch for branching the amplified multiplexed optical signal and producing a branched amplified optical signal, a second opto-electric converter for converting the branched amplified optical signal into an electric signal, an amplified output control circuit for setting an output intensity of the amplified multiplexed signal according to the number of optical signals and comparing the output intensity with that of the electric signal, and an injection current control circuit for controlling an injection current injected to the excitation light source according to a result of the comparison by the amplified output control circuit.

Additionally, the linear relay optical amplifier transmitter in accordance with the present invention includes the optical amplifying apparatus, an optical amplifying apparatus, and a linear relay optical amplifying apparatus connected via an optical transmission path to the optical amplifying apparatus. The amplifying apparatus includes a control signal transmitter for transmitting a control signal including the number of optical signals. On the other hand, the linear relay optical amplifying apparatus includes a relay optical amplifier for directly amplifying the multiplexed optical signal and for outputting therefrom an amplified multiplexed optical signal, and a relay optical amplifier controller for controlling an output from the relay optical amplifier according to the control signal. In this construction, the control signal transmitter includes a control signal adding circuit for adding the control signal to the multiplexed optical signal.

Specifically, on the light transmission side of the optical amplifying apparatus in accordance with the present invention, there are obtained branched outputs for the respective optical digital signals to be detected by photodiodes such that the number of optical signals is measured by an optical signal counting detector. Thereafter, a laser (to be abbreviated as LD herebelow) for monitor and control operations is driven to transmit a control signal representing the state of transmission of each optical signal from the light transmission side to the optical linear relay.

Even when the light signal of one or more wavelengths is interrupted, the output from the optical amplifier is controlled in accordance with the number of inputted optical signals, it is possible to keep the output level of the output from the optical amplifier for the optical signal of each wavelength regardless of the states of optical signals of the other wavelengths.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
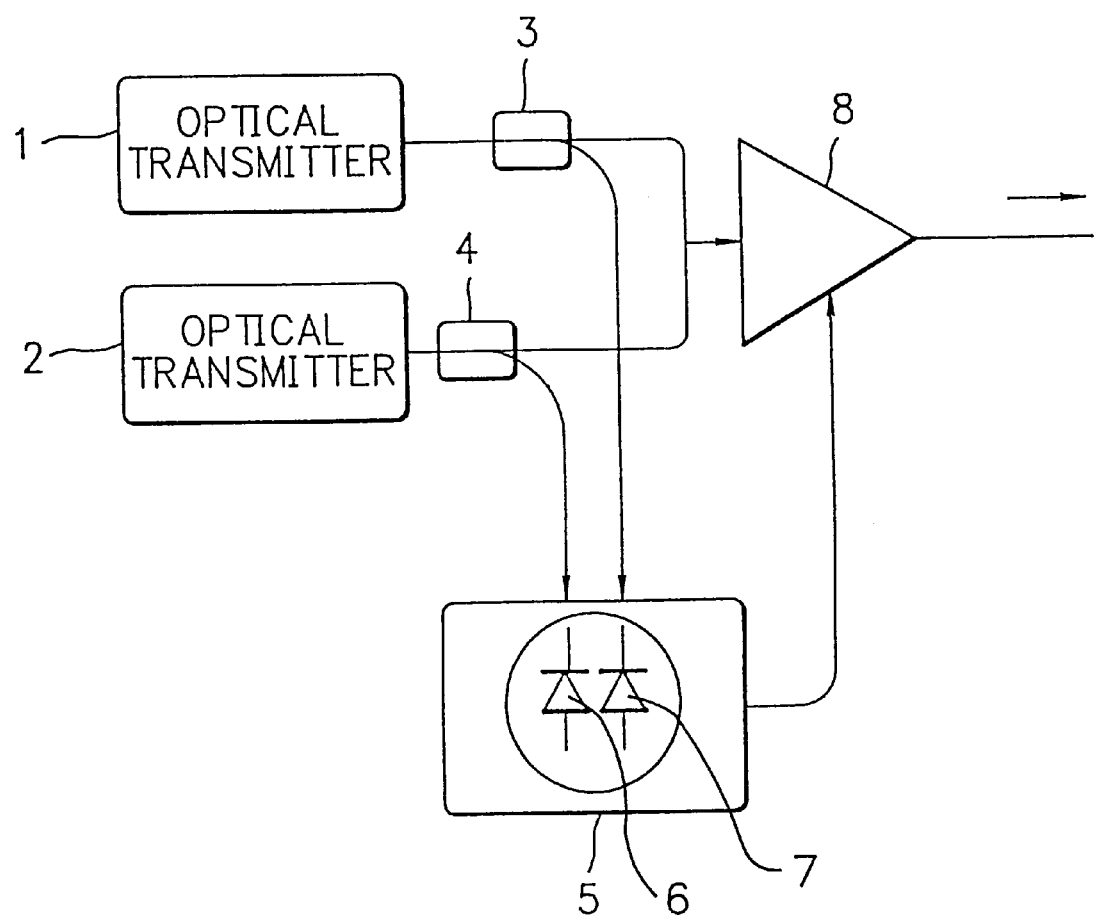
FIG. 1 is a schematic block diagram showing the configuration of an embodiment of the optical amplifying apparatus for linear relay in accordance with the present invention.

Referring now to the drawings, description will be given in detail of embodiments the optical amplifying apparatus and the linear relay optical amplifier transmitter in accordance with the present invention.

FIG. 1 shows an embodiment of the linear relay optical amplifying apparatus in accordance with the present invention. In this constitution, optical transmitters 1 and 2 respectively transmit optical signals having mutually different wavelengths. In this regard, for easy understanding of the description, it is assumed that two optical digital signals are multiplexed with each other as an example of multiplexing operation. The respective optical signals optically branch in optical branches 3 and 4 into main and branch optical signals.

The branch signals are respectively converted through photodiodes 6 and 7 into electric signals such that it is then decided whether or not transmitters 1 and 2 are transmitting optical signals. When each of these transmitters 1 and 2 is normally outputting the signal at a fixed strength, a control signal indicating that the number of optical signals is two is sent to an optical amplifier 8. In the amplifier 8, the gain thereof is accordingly controlled to attain an optical output when the number of optical signals is two.

Figure 2:
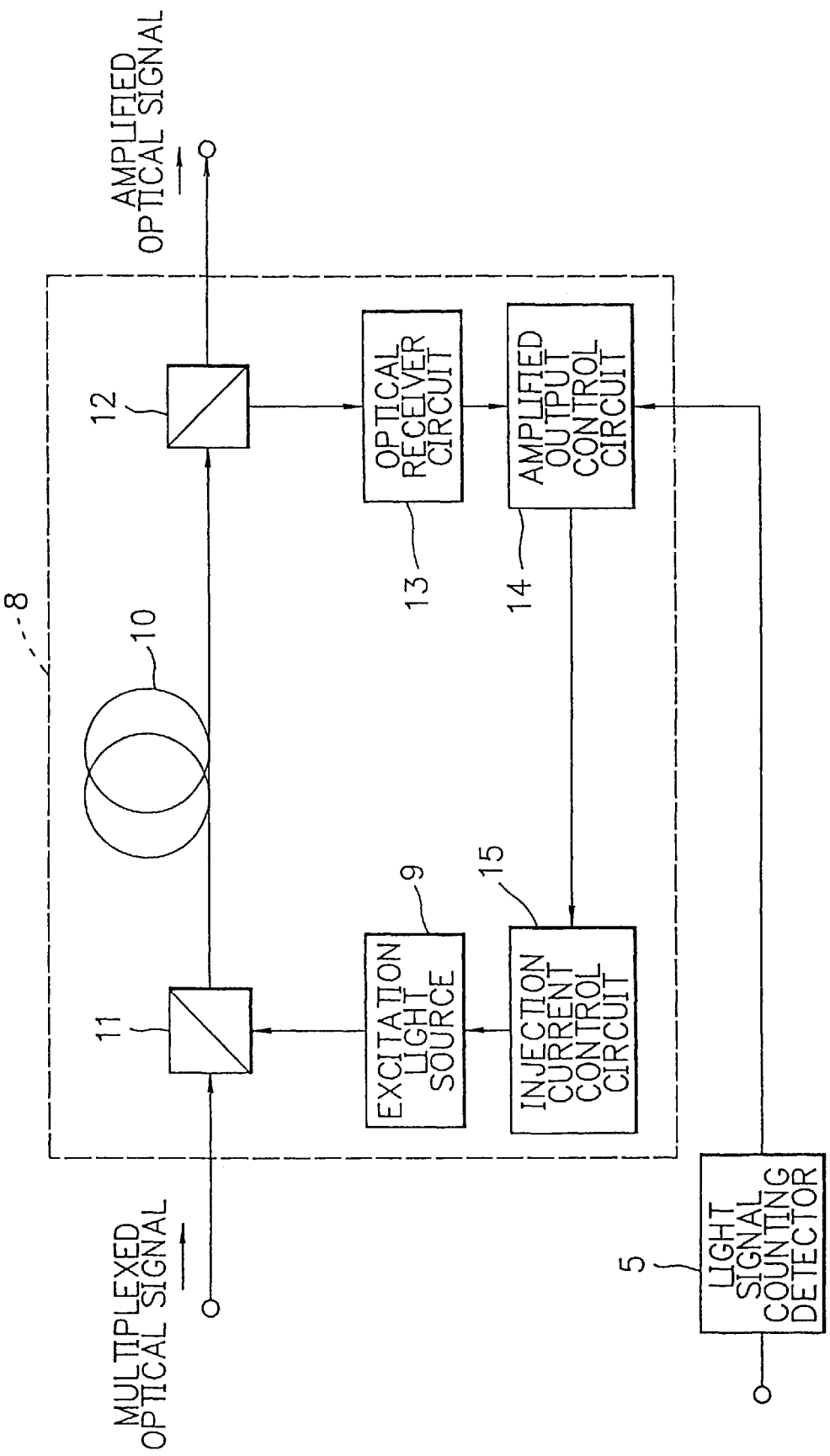
FIG. 2 is a block diagram showing the construction the optical amplifying apparatus for use in the embodiment in accordance with the present invention.

Referring next to FIG. 2, description will be given in detail of the configuration and operation of the optical amplifier 8 in the optical amplifying apparatus in accordance with the present invention. FIG. 2 shows in a block diagram the construction of the optical amplifier in the embodiment of the linear relay optical amplifying apparatus in accordance with the present invention. In this system, there is used as the optical amplifier 8 an amplifier using a fiber to which erbium is added, the amplifier being broadly utilized at present.

The optical amplifier 8 basically includes a fiber to which erbium is added 10, an excitation light source 9 for producing an excited light, and an optical mixer 11 for supplying a multiplexed optical signal and the excitation signal to the fiber 10. Moreover, the amplifier used in the optical amplifying facility in accordance with the present invention includes an optical branch 12 in which amplified light branches, a light receiver circuit 13 for converting the amplified branch signal into an electric signal and detecting an output strength thereof, and an amplified out controller 14. Incidentally, although the signal excitation is related to a forward excitation by way of example in this diagram, it is to be appreciated that the configuration of the present invention is applicable even when the signal excitation is associated with a backward excitation.

The controller 14 receives, in addition to the electric signal supplied from the optical receiver 13, a control signal indicating the number of detected optical signals, the signal being detected by the optical signal detector 5 described above.

According to the control signal, the controller 14 recognizes the number of optical transmitters being normally operating at the pertinent time and then sets an amplification output to be outputted from the optical amplifier 8 in accordance with the number of optical signals. The controller 14 compares the value thus set with the amplification output detected by the optical receiver 13 to thereby control the gain of the optical amplifier 8 based on a result of the comparison. Specifically, the gain is supervised by controlling the injection current control circuit 1 supplying an injection current to the excitation light source.

When the detector 5 detects that the optical transmitters 1 and 2 are normally transmitting signals and and the condition is confirmed, the amplifier output is accordingly set and then the gain of the optical amplifier 8 is supervised to retain the output.

In relation to the operation above, assume that a failure occurs in the optical transmitter 1. The optical signal counting detector 5 detects an event in which only the optical transmitter 2 is transmitting an optical signal. If the output from the optical amplifier 8 is controlled as above in this situation, the output is temporarily greatly reduced. To recover the output, a large value of gain will be set to the optical amplifier 8.

However, the transmission from the optical transmitter 1 is actually interrupted, and hence the amplification need be achieved only in association with the optical transmitter 2. For this purpose, the detector 5 sends a control signal to the optical amplifier 8 to notify that the number of optical signals to be actually amplified is one. On receiving the control signal, the amplifier 8 sets the output to a value for the number of optical signals (=1) and hence the gain is controlled to keep the output.

This effect cannot be obtained even if the output from the optical amplifier 8 is simply detected. That is, assume when an output of, for example, 50% of the normal output is detected in the last stage of the optical amplifier 8. However, it cannot be determined whether the situation is caused by a failure in either one of the optical transmitters or by reduction in the transmission outputs from the optical transmitters.

In contrast therewith, in accordance with the optical amplifying apparatus in accordance with present invention, the setting and adjusting of the optimal output from the optical amplifier 8 can be accomplished according to the numbers of optical signals from the optical transmitters.

Next, description will be given of an embodiment of the optical amplifier transmitter for linear relay to which the optical amplifying apparatus is applied in accordance with the present invention.

Figure 3:
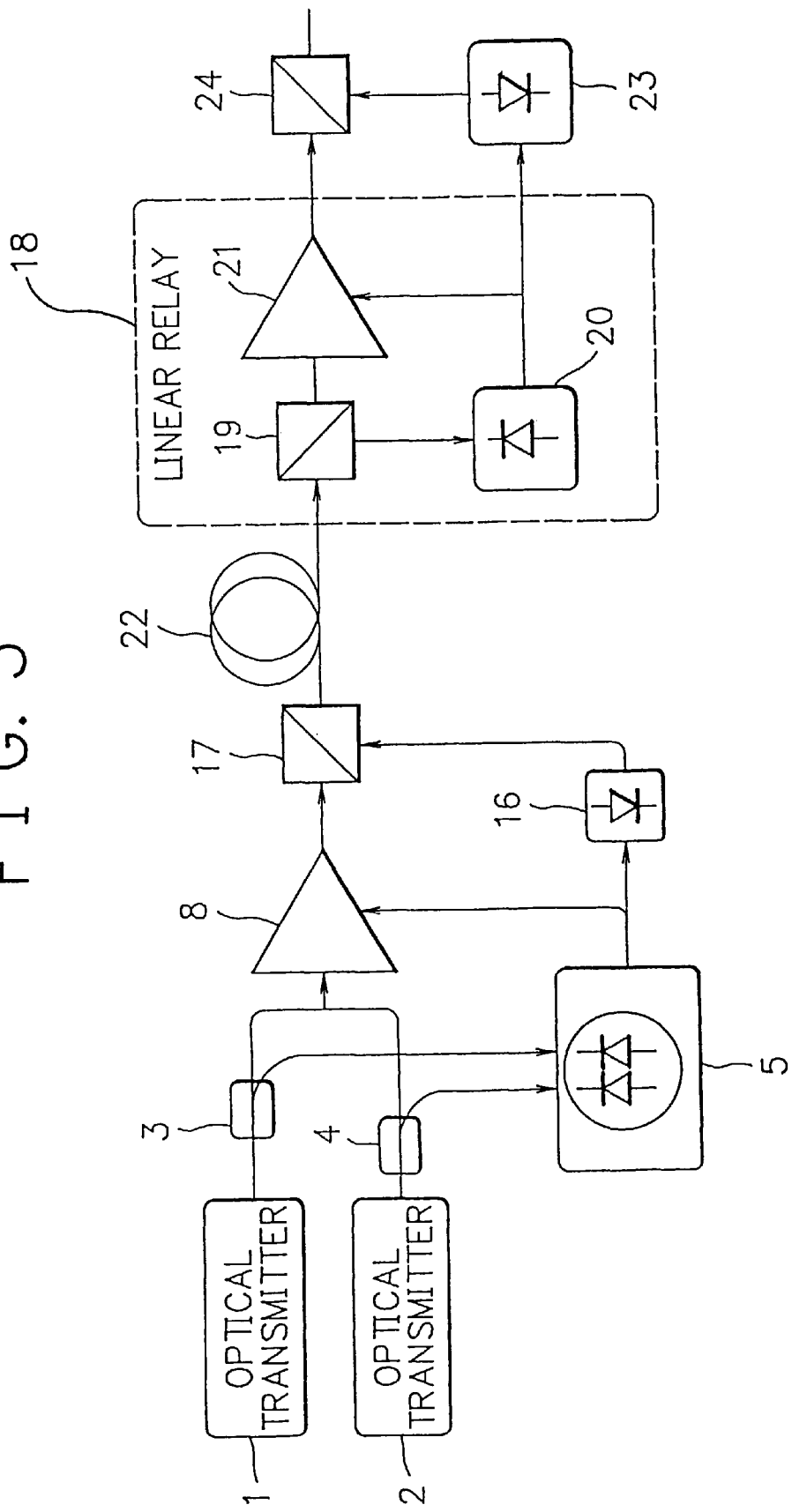
FIG. 3 is a block diagram showing the structure of an embodiment of the optical amplifying apparatus for linear relay using the optical amplifying apparatus in accordance with the present invention.

FIG. 3 shows in a block diagram the construction of an embodiment of the optical amplifier transmitter for linear relay to which the optical amplifying apparatus is applied in accordance with the present invention. The optical amplifier transmitter of the present invention includes an optical terminal facility including the optical amplifying apparatus in accordance with the present invention and a linear relay apparatus 18 connected via a transmission path 22 to the optical terminal facility. In the diagram of FIG. 3, the configuration includes only one linear relay apparatus 18. However, there are ordinarily arranged a large number of linear relays sequentially connected to each other in series.

Additionally, although the optical amplifier 8 of the optical amplifying apparatus in the optical terminal facility is configured in accordance with the aspect of the present invention as shown in FIG. 2, the pertinent configuration is not shown in this diagram.

In accordance with the present invention, the linear relay optical amplifier transmitter has an aspect that the optical amplifying apparatus can be controlled within the optical terminal facility as well as in the overall region the relay apparatus. In other words, in a case in which a failure occurs in the optical transmitter of the optical terminal facility, even when the amplified output is controlled on the side of the optical terminal facility, if an appropriately operation is not conducted on the side of the relay apparatus, it will be impossible to accomplish a normal operation in the overall system. To overcome this problem, the linear relay optical amplifier transmitter includes means for transmitting also to the side of the linear relay apparatus the number of optical signals detected by the optical amplifying apparatus in the optical terminal facility. Thereby to the number of optical signals, a gain control operation is carried out in the optical amplifier of each linear relay apparatus in almost the same manner as for the optical terminal facility.

In the embodiment of the present invention shown in FIG. 3, the number of optical signals detected by the optical signal counting detector 5 is passed to an LD driver circuit 16 to be delivered to an optical mixer 17 as a control signal having a wavelength different from that of the primary optical signal. A mixed signal from the optical mixer 17 is then sent to a linear relay apparatus disposed at a downstream position in the system. In contrast therewith, on the side of the linear relay apparatus, the control signal is acquired through a branching operation by an optical branch 19 disposed at a stage preceding the optical amplifier 21. The monitor and control circuit 20 accordingly sets an appropriate amplification output. The gain of the optical amplifier 21 is adjusted to keep the amplification output. Basically, the optical amplifier 21 is configured in the same fashion as for the circuit shown in FIG. 2 and hence the gain control operation is also conducted in almost the same manner.

When another linear relay apparatus is arranged at a downstream position in the system, the monitor and control circuit 20 transmits the signal indicating the number of optical signals to a LD driver circuit 23. The driver 23 then delivers the signal to an optical mixer 24 such that the signal is added to the primary optical signal. A mixed signal from the mixer 24 is then transmitted to a subsequent transmission path.

In relation to the present embodiment, description has been given of an example employing a wavelength multiplexing operation as means for adding the control signal indicating the number of optical signals to the primary optical signal. However, it is also possible to adopt means for superimposing the control signal onto the primary optical signal through, for example, a phase modulation.

In the optical amplifying apparatus and the linear relay optical amplifier transmitter in accordance with the present invention, the output of each optical digital signal is acquired through a branching operation on the optical transmitter side. The output signal is detected by a photodiode and is then counted by an optical signal counting detector to obtain the number of optical signals. Thereafter, a laser diode for monitor and control operations is driven such that the state of transmission of each optical signal is sent as a control signal from the optical transmission side to the optical linear relay.

Thanks to the configuration above, when the optical signal of at least one wavelength is interrupted, the output from the optical amplifier is adjusted according to the number of input optical signals. As a result, the output from the optical amplifier can be fixed for the optical signal of each wavelength regardless of the states of transmission of signals of other wavelengths.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical amplifying apparatus, comprising:
   at least two optical signal transmitter means for respectively transmitting therefrom optical signals having mutually different wavelengths;
   wavelength multiplexing transmitter means for wavelength multiplexing the optical signals to transmit therefrom a wavelength multiplexed optical signal;
   optical amplifier means for directly amplifying the multiplexed optical signal and outputting therefrom an amplified multiplexed optical signal;
   optical signal counting detector means for branching the optical signal into component signals thereof and detecting the number of optical signals currently being transmitted in the multiplexed optical signal; and
   optical amplifier control means for controlling an output from the optical amplifier means according to the number of optical signals, wherein:
   the optical amplifier means includes a fiber made of material to which a rare earth element is added, an excitation light source for outputting therefrom an excitation light, and
   an optical mixer for inputting the multiplexed optical signal and the excitation signal to the fiber and the optical amplifier control means includes an excitation light control circuit for controlling an intensity of the excitation light according to the number of optical signals and
   a linear relay optical amplifying apparatus connected via an optical path to the optical amplifying apparatus, wherein
   the optical amplifying apparatus includes control signal transmitter means for transmitting a control signal including the number of optical signals and the linear relay optical amplifying apparatus includes relay optical amplifier means for directly amplifying the multiplexed optical signal and for outputting therefrom an amplified multiplexed optical signal and relay optical amplifier control means for controlling an output from the relay optical amplifier means according to the control signal.

2. An optical amplifying apparatus in accordance with claim 1, wherein the optical signal counting detector means includes:

optical signal branch means for producing branched optical signals;

first opto-electric convertor means for converting each of the branched optical signal into an electric signal; and decision means for determining presence or absence of each of the optical signals detected by the first opto-electric convertor means.

3. An optical amplifying apparatus in accordance with claim 2, wherein the first opto-electric convertor means is a photodiode for respectively receiving lights having wavelengths respectively of the separated optical signals according to the number of multiplexed wavelengths in the wavelength multiplexing operation.

4. An optical amplifying apparatus in accordance with claim 2, wherein the optical amplifier means further includes:

an optical branch for branching the amplified multiplexed optical signal and producing a branched amplified optical signal;

second opto-electric converter means for converting the branched amplified optical signal into an electric signal;

an amplified output control circuit for setting an output intensity of the amplified multiplexed signal according to the number of optical signals and comparing the output intensity with that of the electric signal; and an injection current control circuit for controlling an injection current injected to the excitation light source according to a result of the comparison by the amplified output control circuit.

5. An optical amplifying apparatus in accordance with claim 1, wherein the control signal transmitter means includes control signal transmitting means for transmitting as the control signal an optical signal having a wavelength different from that of the optical signal, and an optical mixer for mixing the control signal with the amplified multiplexed optical signal and the relay optical amplifier control means includes an optical branch for branching the amplified multiplexed optical signal into the control signal, thereby controlling a gain of the relay optical amplifier means according to the control signal.

6. An optical amplifying apparatus in accordance with claim 5, further including another linear relay optical amplifying apparatus connected to the linear relay optical amplifying apparatus, wherein the relay optical amplifier means includes relay control signal transmitter means for transmitting the control signal and the linear relay optical amplifying apparatus additionally provided includes relay optical amplifier means for directly amplifying the multiplexed optical signal and for producing an amplified multiplexed optical signal and relay optical amplifier control means for controlling an output from the relay optical amplifier means according to the control signal.

* * * * *